RE 25770
June 6, 1961                E. S. JOHANSON                2,987,465
                       GAS-LIQUID CONTACTING PROCESS
                           Filed June 20, 1958
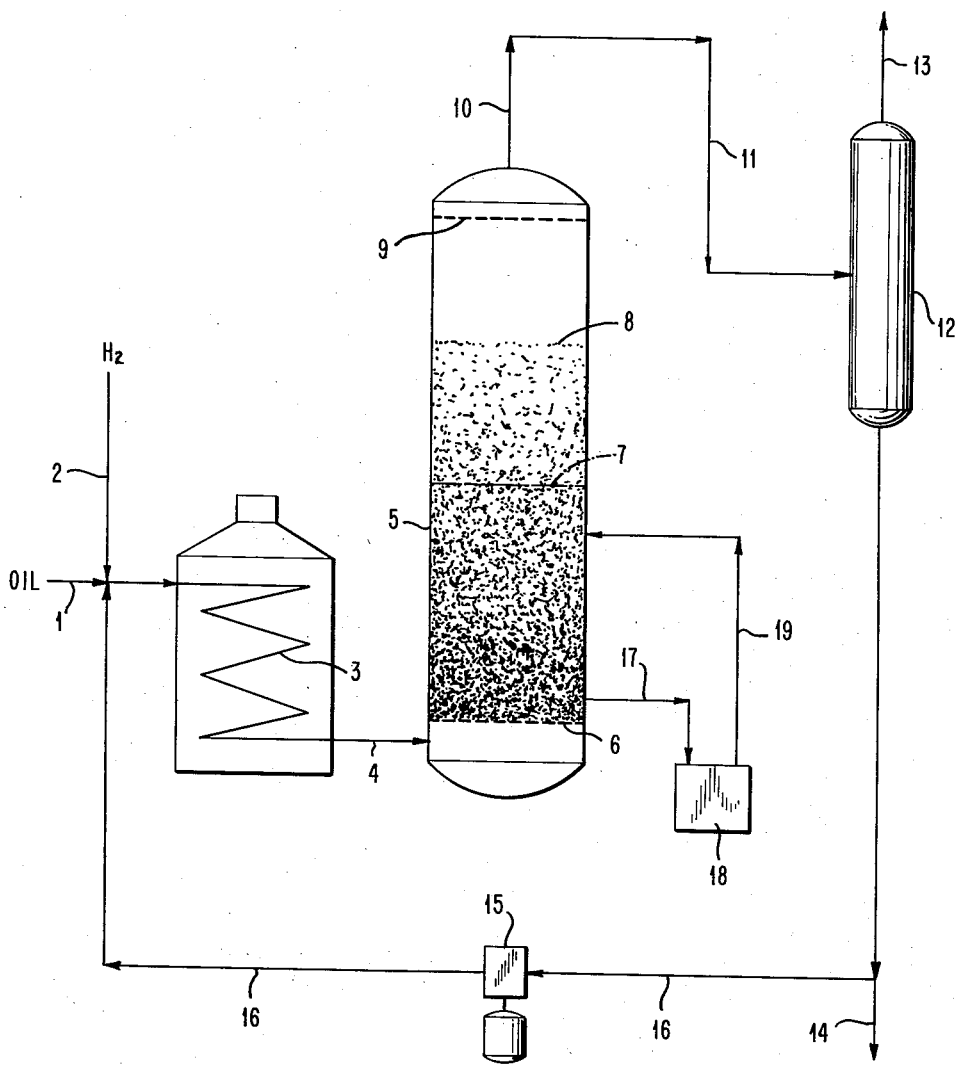
INVENTOR.
EDWIN S. JOHANSON
BY
Paul W. Garbo
AGENT United States Patent Office 2,987,465
Patented June 6, 1961

2,987,465
GAS-LIQUID CONTACTING PROCESS
Edwin S. Johanson, Princeton, N.J., assignor to Hydrocarbon Research, Inc., New York, N.Y., a corporation of New Jersey
Filed June 20, 1958, Ser. No. 743,304
12 Claims. (Cl. 208—10)

This invention relates to an improved method of contacting a liquid and a gasiform material, particularly to effect a chemical or physical change.

Many different types of processes are in use and have been suggested for bringing about contact between liquid and gasiform materials. These processes involve combinations of various manipulative steps, e.g., upflow, downflow and horizontal flow of the liquid, concurrent and countercurrent flow of the gasiform material relative to the flow of liquid and the use of solid contact materials in the form of fixed, moving, and fluidized beds. These conventional processes have various problems or shortcomings connected with them. For example, they often suffer from poor contact between the liquid and gasiform materials and, if a solid contact material such as a catalyst is used, between the liquid and gasiform reactants and the surfaces of the particles of contact material. Another limiting factor often involved in these processes when a contact material is used is that the pressure drop across the bed of contact material rises rapidly after a certain point as the throughput rate of the liquid is increased. Still another limiting factor, which may occur in connection with certain processes, e.g., hydrocarbon conversion processes, is that deposits tend to form on the inner walls of the reactor and also on the surfaces of any contact particles which are used. This causes loss of activity if a catalytic contact material is being employed and may also cause plugging up of the reactor.

It is an object of this invention to provide an improved process of effecting contact between liquid and gasiform materials. A further object is to provide a process of chemically reacting liquid and gasiform materials in the presence of a mass of solid particles of contact material whereby a decreased pressure drop in the particulate mass, improved contact between the reactants and the contact material, and a decrease in the rate of formation of deposits in the reactor may be accomplished.

These and other objects are attained by concurrently flowing streams of the liquid and gasiform material upwardly through a vessel containing a mass of solid particles of a contact material, the mass of solid particles being maintained in random motion within the vessel by the upflowing streams. A mass of solid particles in this state of random motion in a liquid medium may be described as "ebullated." An ebullated mass of solid particles has a gross volume that is larger than that of the same mass when it is stationary. The benefits of this invention are obtained when this expansion is at least 10% of the volume of the stationary mass. The contact material is in the form of beads, pellets, lumps, chips or like particles usually having an average dimension of approximately at least 1/32 inch, and more frequently in the range of 1/16 to 1/4 inch. The size and shape of the particles used in any specific process will depend on the particular conditions of that process, e.g., the density, viscosity and velocity of the liquid involved in that process.

It is a relatively simple matter to determine for any ebullated process the range of throughput rates of upflowing liquid which will cause the mass of solid particles to become expanded while the particles are maintained in random motion. The gross volume of the mass of contact material expands when ebullated without, however, any substantial quantity of the particles being carried away by the upflowing liquid and, therefore, a fairly well-defined upper level of randomly moving particles establishes itself in the upflowing liquid. This upper level above which few, if any, particles ascend will hereinafter be called the upper level of ebullation. In contrast to processes in which fluid streams flow downwardly or upwardly through a fixed mass of particles, the spaces between the particles of an ebullated mass are large with the result that the pressure drop of the liquid flowing through the ebullated mass is small and remains substantially constant as the fluid throughput rate is increased. Thus, a considerably smaller consumption of power is required for a given throughput rate. Moreover, the ebullated mass of particles promotes much better contact both between the liquid and gasiform streams and between these fluids and the surfaces of the particles. Under these conditions, a significantly greater fluid throughput rate may be used without impairing the desired degree of contact than if conventional downflow or upflow through a fixed bed of contact particles is used. Additionally, it should be noted that the random motion of particles in an ebullated mass causes these particles to rub against each other and against the walls of the vessel so that the formation of deposits thereon is impeded or minimized. This scouring action helps to prevent agglomeration of the particles and plugging up of the vessel. This effect is particularly important where catalyst particles are employed and maximum contact between fluid reactants and the catalytic surfaces is desired, since such surfaces are then exposed to the reactants for a greater period of time before coming fouled or inactivated by foreign deposits. For this reason, the process of this invention is particularly useful in carrying out various chemical reactions between liquid and gasiform materials in the presence of a solid catalyst. Some of these reactions are hydrogenation of hydrocarbon oils for refining purposes such as desulfurization or for hydrocracking the oil to gasoline and other valuable products, hydrogenation of animal and vegetable fats and oils so as to convert them to refined edible products, various halogenation processes, e.g., chlorination of toluene to form benzyl chloride and the chlorination of paraffin wax, oxidation processes employing air or purified oxygen, e.g., the oxidation of acetaldehyde to acetic acid, sulfonation and nitration processes like reacting benzene vapor with sulfuric acid, and amidization processes such as contacting molten nicotinic acid with ammonia.

The process of this invention may be carried out under a wide variety of conditions. To obtain the advantages of this invention it is only necessary that the liquid and gasiform materials flow upwardly through a mass of particulate material at a rate causing such mass to reach an ebullated state. In each ebullated system, variables which may be adjusted to attain the desired ebullation include the flow rate, density and viscosity of the liquid and the gasiform material, and the size, shape and density of the particulate material. However, it is a relatively simple matter to operate any particular process so as to cause the mass of contact material employed to become ebullated and to calculate the percent expansion of the ebullated mass after observing its upper level of ebullation through a glass window in the vessel or by other means such as liquid samples drawn from the vessel at various levels. In most processes carried out in accordance with this invention, the contact particles will be approximately of a size passing through 1/4 inch mesh openings but retained by 1/32 inch mesh openings (i.e., between about 3 and 20 mesh screens of the Tyler scale), the gross density of the stationary mass of contact material between about 25 and 200 pounds per cubic foot, the flow rate of the liquid between about 20 and 120 gallons per minute per square foot of horizontal cross-section of the ebullated mass, and the expanded volume of the ebullated mass not more than about double the volume of the settled mass. In certain cases, liquid flow rates as low as 5 and as high as 500 gallons per minute per square foot of horizontal cross-section of the ebullated mass may be used. Similarly, the expanded volume of the ebullated mass may be several times the volume of the settled mass but expanding the settled mass by ebullation to a volume more than three times its original volume is rarely justified on technical or economic grounds.

Generally, the process conditions of temperature, pressure and ratio of liquid to gasiform material in any particular system operated in accordance with this invention may be similar to the conditions used in operating the system without ebullating the particulate material. However, when the ebullating technique of this invention is used, a greater degree of contact is obtained and, therefore, the time to bring about the desired chemical or physical change in any particular system will be shortened. The better contact achieved with ebullated solids is particularly beneficial in chemical reactions performed in the presence of solid catalysts which are expensive. In such chemical reactions, the ebullated catalyst not only will have longer life thereby curtailing costly regeneration but also will give better catalyst utilization thereby increasing the space velocity of the fluid reactants.

The invention will now be illustrated with reference to the drawing which diagrammatically shows a process for reacting hydrogen with a heavy hydrocarbon oil.

Charge stock from line 1 is combined with recycle oil from line 16 and hydrogen-containing gas from line 2 is added to the combined oil, all of the fluid reactants flowing through heater 3. The preheated gas-liquid mixture is thence transferred by line 4 to the bottom of reactor 5 which contains a mass of solid particles of hydrogenation catalyst supported on screen or perforated plate 6. When the process is not in operation, the catalyst mass has a stationary bed level 7. When, however, the process according to this invention is being carried out, the particles are in constant motion with respect to each other and the gross mass expands so that its upper boundary or upper level of ebullation is at 8. The reactor may contain a second screen or perforated plate 9 near its top to prevent stray particles of contact material from leaving reactor 5 with the reaction effluent. It should be noted that screen 9 is near reactor outlet 10, well above upper level of ebullation 8. The reaction effluent discharging through outlet 10 flows through line 11 into separator 12 wherein it is separated into gasiform and liquid phases. A gasiform stream which comprises unreacted hydrogen and both gaseous and vaporized hydrocarbons is drawn off by line 13 and conventionally treated to recover hydrogen, hydrocarbon gases, gasoline, etc. The separated hydrogen may, of course, be used as part of the hydrogen feed to the system. Part of the liquid drawn from separator 12 through line 14 is sent to product recovery or further treatment to obtain valuable products, e.g., by fractional distillation, catalytic cracking, lubricating oil refining, etc. The remainder of the liquid is circulated by pump 15 through line 16 for recycling to reactor 6 after being combined with fresh feed and hydrogen as aforesaid.

The above description illustrates a process which operates batch-wise as far as the contact material is concerned. When a process is relatively clean, i.e., little or no foreign deposits are formed on the contact particles, the process may be operated in this fashion for a considerable period without interruption. However, when a process causes substantial fouling deposits to be formed on the contact particles, particularly those depending upon high catalytic activity to promote reaction, it is necessary to interrupt the process at intervals and replace the fouled contact material with fresh or regenerated material, although these intervals are lengthened because of the scouring effect produced by ebullation, as already mentioned. When it is desired to operate the process in a completely continuous manner, contact material may be continuously withdrawn from reactor 6 through line 17 as a slurry and sent to catalyst regeneration plant 18. Therein the catalyst particles are separated from the liquid, regenerated, reslurried in the liquid and sent back to reactor 6 by way of line 19.

The invention will now be further elucidated by examples which demonstrate its versatility in operations involving contact between gasiform and liquid materials to effect chemical and/or physical changes.

*Example 1*

A residual hydrocarbon oil having a gravity of 8.3° API, a sulfur content of 5.3% by weight and a Ramsbottom carbon residue of 17.2% by weight was hydrogenated by a process as illustrated in the drawing using a cobalt molybdate hydrogenation catalyst of 12 to 16 mesh particle size, a pressure of 3000 pounds per square inch gauge and a temperature of 830° F. Hydrogen-rich gas was supplied to provide 1000 standard cubic feet of hydrogen for each barrel of charge stock entering the reactor. Treated oil was recycled to the reactor at the rate of 27 volumes per volume of charge stock and hydrogen recovered from the reaction effluent was also recycled to the reactor so that the total hydrogen flowing through the reactor was 7000 standard cubic feet for each barrel of charge stock. During the first 800 hours of operation, the charge stock together with recycled oil had a total upflow rate of 30 gallons per minute per square foot of horizontal cross-section of the reactor. At this liquid flow rate, the mass of catalyst particles was mildly ebullated and its volume was expanded about 15% over that of the same mass when in a settled state. While the charge stock was essentially a residuum of hydrocarbons boiling above 900° F., the total liquid product recovered from the hydrogenation process comprised approximately 70% by volume of hydrocarbons boiling at temperatures not exceeding 900° F. Accordingly, the operation is said to effect about 70% conversion of the charge stock. The sulfur content of the total liquid product increase from 0.4% to 1.0% by weight during the first 300 hours of operation which represented the usual high initial deactivation of fresh catalyst, but only from 1.0% to 1.4% by weight during the 300 to 800 hour period. The treated oil recycle rate was then reduced to yield a liquid flow rate of 20 gallons per minute per square foot of horizontal cross-section of the reactor during the 800 to 1000 hour period at which rate substantially no ebullation or expansion of the catalyst mass occurred. Under these conditions, the sulfur content of the total liquid product increased from 1.4% to 1.7% by weight, indicating a considerable rise in the deactivation rate of the catalyst over that obtained during the 300 to 800 hour period when the mass was in an ebullated state. During the period from 1000 to 1230 hours, the oil recycle rate was increased to yield a total liquid flow rate of 40 gallons per minute per square foot and at this rate the catalyst mass was again in an ebullated state and its volume expanded to about 20 to 25% over that of the mass in a settled state. In this latter period, there was substantially no increase in sulfur content of the liquid product. The lower rate of decline of catalytic activity obtained during the 300 to 800 and 1000 to 1230 hour periods as represented by rise in sulfur content of the liquid product as compared with the higher rate of decline of catalytic activity obtained in the 800 to 1000 hour period when the catalyst mass was stationary indicates that the rate of catalyst deactivation is substantially less when the process is run with the catalyst mass in an ebullated state than when a conventional fixed bed is used.

Comparing the results obtained when the process was operated with the catalyst particles in an ebullated state with the results of a hydrogenation process conducted under similar conditions but with liquid downflow through a fixed bed of catalyst particles, it was found that each pound of ebullated catalyst was as effective as approximately two pounds of catalyst in a fixed bed. Specifically, it was observed in this example of the invention that the charge stock was hydrogenated at the rate of 0.14 barrel per day per pound of ebullated catalyst in the reactor. This rate is indicative of a higher space velocity than can be achieved with fixed catalyst particles if comparable products are to be obtained.

*Example 2*

The charge stock of Example 1 was again treated by the general process shown in the drawing, this time with the reactor containing a mass of inert glass beads (0.085 inch in diameter) rather than a catalyst. The process was carried out at a pressure of about 3000 pounds per square inch gauge and a temperature of 870° F. Fresh hydrogen was supplied at the rate of 1000 standard cubic feet per barrel of charge stock and treated oil was recycled at the rate of 19 volumes per volume of charge stock yielding an overall liquid flow rate of 60 gallons per minute per square foot of horizontal cross-section of the reactor. Hydrogen separated from the reaction effluent was recycled to make the total hydrogen flow through the reactor 5000 standard cubic feet per barrel of charge stock. Under these conditions, the mass of glass beads was well ebullated, the expanded volume of which was more than 50% greater than that of the settled mass.

This operation resulted in 55% conversion of hydrocarbons boiling above 900° F. The total liquid product had a gravity of 15° API and its boiling point distribution was as follows:

| Volume percent: | Boiling point range, °F. |
| --- | --- |
| 13% | Up to 400 |
| 15% | 400–600 |
| 27% | 600–900 |
| 45% | Over 900 |

When the components of the product boiling up to 400° F. were distilled off, the remaining product had a viscosity of 200 SFS at 122° F. so that it could be directly used as No. 6 fuel oil. The results of this operation in terms of product demonstrate that even inert glass beads when maintained in an ebullated state are effective in bringing about intimate contact between the gaseous and liquid reactants and, hence, noteworthy hydrocracking of the charged residuum.

*Example 3*

Natural gas containing approximately 5% by volume of hydrogen sulfide is scrubbed with chilled acetone which is an effective absorbent for hydrogen sulfide. The scrubbing tower is equipped with heat exchange tubes which are submerged by the acetone and which serve to maintain the acetone at a temperature of −15° F. The natural gas at a pressure of 600 pounds per square inch gauge is passed upwardly through the tower which also contains a mass of fine sand (20 to 32 mesh size). Acetone is circulated upwardly through the tower at the rate of 50 gallons per minute per square foot of horizontal cross-section of the tower while the rate of gas flow is controlled to give a scrubbed gas containing not more than 1% by volume of hydrogen sulfide.

Under the operating conditions, the mass of fine sand is ebullated to an expanded volume about 40% greater than the volume of the settled mass. In this case, the randomly moving sand particles promote not only intimate contact between the gas and absorbent liquid but also temperature equalization in the liquid and high heat transfer at the surfaces of the cooling tubes. Since the absorption of hydrogen sulfide in acetone is accompanied by the release of heat, the ebullated solid mass performs the very desirable function of spreading the heat released predominantly in the bottom portion of the tower to all the other portions of the tower. Thus, localized temperature surges which would diminish the absorption of hydrogen sulfide by acetone are substantially eliminated. Furthermore, the ebullated sand continuously impinges on and rubs the surfaces of the cooling tubes in contact with the acetone so that the rate of heat transfer is nearly double that observed in the absence of the ebullated sand.

The acetone leaving the top of the tower flows to a desorption vessel wherein the pressure is decreased to nearly atmospheric pressure while nitrogen is bubbled up through the acetone to strip the absorbed hydrogen sulfide therefrom. Thence, acetone substantially free of hydrogen sulfide is repressurized by pump and again introduced into the bottom of the scrubbing tower operating at a pressure of 600 pounds per square inch gauge.

*Example 4*

Synthesis gas comprising hydrogen and carbon monoxide as the predominant components is produced by the partial combustion of fuel oil with oxygen of 98% by volume purity. Very fine soot formed during the partial combustion is dispersed in the synthesis gas to the extent of 120 grams per 1000 standard cubic feet of gas. The bulk of this soot can not be eliminated by passing the gas through a conventional water wash tower.

Pursuant to this invention, a vessel like reactor 5 of the drawing contains a mass of iron particles (20 to 35 mesh size) ebullated (volume expansion 35%) by water flowing upwardly at the rate of 80 gallons per minute per square foot of horizontal cross-section of the vessel. The passage of synthesis gas upwardly through the vessel is regulated to yield scrubbed gas containing not more than 0.05 gram of soot per 1000 standard cubic feet of gas. Clearly, the randomly moving and colliding ebullated particles not only bring about extremely good gas-liquid contact but also promote wetting of the soot particles by the water which ordinarily shows little wetting propensity with respect to soot.

*Example 5*

Coal having 38% by weight of volatile matter and 6% by weight of ash on a moisture-free basis is pulverized to pass through a 100-mesh screen and then admixed with hydrocarbon oil in the weight ratio of 3 parts of oil per part of coal. The coal-oil suspension is passed upwardly through a hydrogenator similar to reactor 5 of the drawing together with hydrogen. The hydrogenator contains a mass of iron oxide hydrogenation cataylst particles of 4 to 6 mesh size. The coal-oil suspension flows up through the hydrogenator at the rate of 80 gallons per minute per square foot of horizontal cross-section of the hydrogenator thereby effecting ebullation of the catalyst particles with approximately 20% expansion of the settled volume of the catalyst mass. Hydrogen-rich gas (90% by volume hydrogen) is supplied to the bottom of the hydrogenator at the rate of 24,000 standard cubic feet for each ton of coal entering the hydrogenator. The hydrogenation is conducted at a temperature of 870° F. and a pressure of 10,000 pounds per square inch gauge. The reaction effluent comprising coal-oil suspension discharges from the hydrogenator into a separator whence gasiform and liquid streams are separately withdrawn. Part of the liquid stream which is an oil suspension of partially hydrogenated coal particles is recycled directly to the hydrogenator to maintain the aforesaid flow rate of 80 gallons per minute per square foot and to provide a residence time of 30 minutes for the coal particles in the hydrogenator. About 80% of the carbon in the coal is thus converted to liquid and gaseous hydrocarbons including 130 pounds of gasoline for each ton of processed coal.

The foregoing examples illustrate the diversity of chemical and/or physical processes involving intimate contact between liquid and gasiform materials which may be advantageously carried out in the presence of ebullated solids. If the desired process does not require a catalyst, then an inert comminuted solid material is selected to provide the ebullated mass. As shown in Examples 4 and 5, very fine solid particles may be carried in suspension by the gasiform or liquid stream entering the contact zone without unfavorably influencing the ebullated solid mass therein. To the contrary, such suspended fine particles frequently enhance the scouring of the surfaces of the ebullated mass so that where the ebullated particles are catalytic fouling of these catalytic particles by the accumulation of foreign deposits thereon is curtailed and the effective catalyst life is lengthened. In Example 5, an increase of at least 50% in the catalyst life is observable.

For the purposes of this invention, the liquid and gasiform material which are to be brought into thorough contact with one another have different compositions, i.e., the gasiform material is not merely the liquid in vapor form. While certain liquid flow rates and sizes of ebullated solid particles have been set forth for most practical operations, deviations from these flow rates and particle sizes are possible depending upon the several variables hereinbefore mentioned of each contacting operation. For instance, petroleum coke particles of 42 to 60 mesh size are ebullated by oil flowing upwardly at the rate of 10 gallons per minute per square foot of horizontal cross-section of the contact zone. On the other hand, fired clay pellets in the form of one-half inch diameter spheres are ebullated by the same oil flowing at the rate of 150 gallons per minute per square foot.

Many modifications of the invention will occur to those skilled in the art upon consideration of this disclosure without departing from the spirit or scope thereof. For instance, protective screen 9 in reactor 5 of the drawing may be omitted and its function may be duplicated by enlarging the horizontal cross-section of the top portion of reactor 5 beginning at a level in the vicinity of the upper level of ebullation 8. Thus, the liquid flow rate up through the top portion of reactor 5 will be appreciably decreased with the result that entrained particles from the ebullated mass will tend to drop back thereto. The liquid passing through reactor 5 does not have to be withdrawn through top outlet 10. Instead, the liquid may be discharged through a lateral outlet in reactor 5 disposed at a level above the upper level of ebullation 8 while a gasiform effluent is separately withdrawn through top outlet 10. In other words, the separation of the admixed liquid and gasiform streams may be carried out in the top portion of reactor 5 rather than in separator 12 shown in the drawing. In many cases, it will be desirable to recycle part of the liquid withdrawn from the top portion of reactor 5 by pumping it back into the bottom of the reactor after passing the recycle liquid through a heat exchanger to cool or heat this recycle stream in order to hold the temperature in reactor 5 at a desired value for an exothermic or endothermic operation, respectively. On the other hand, liquid may be recycled internally within reactor 5; in such case, a standpipe with a top open end above upper level of ebullation 8 may be used to pass liquid from the top of reactor 5 to a pump disposed below screen 6 in the bottom of reactor 5, the liquid discharged by the submerged pump thence flowing upwardly again through the mass of ebullated solids. In lieu of screen 6 which uniformly distributes the flow of liquid and gasiform material to the entire mass of ebullated solids in reactor 5, the bottom of the reactor may be tapered or funnel-shaped so that the admixed liquid and gasiform streams introduced into the bottom of the funnel will flow up uniformly through the entire ebullated mass. Accordingly, only such limitations should be imposed on the invention as are set forth in the appended claims.

What is claimed is:

1. The process of hydrogenating a carbon containing material in the liquid phase in the presence of a mass of particulate solids of between about ½" diameter and 60 mesh size, said solids being nominally maintained within a contact zone, which comprises passing the liquid carbon containing material and a hydrogen rich gas upwardly through the mass of solids, maintaining the zone at hydrogenation conditions of elevated temperature and hydrogen pressure up to about 10,000 p.s.i.g. so that at least a substantial part of the carbon containing material remains in the liquid phase, maintaining the linear gas velocity for the size and density of the solids below a rate which, by itself, would cause fluidization of the mass, maintaining the linear velocity of the liquid through the mass in the range of 5 to 500 gallons per minute per square foot of horizontal cross section of the contact zone, and, based on the particulate solid size and density and liquid density, such as to maintain the mass of particulate solids in an expanded state of at least 10% greater volume than the settled state of the mass but below a velocity to carry over solids from the zone, the combined liquid and gas flow producing a random motion of the solids in the liquid, maintaining in said contact zone an upper level of liquid above which substantially no particulate solids are carried, and removing a liquid effluent of hydrogenated carbon containing material from the upper part of the contact zone.

2. The process of hydrogenating a carbon containing material as claimed in claim 1 wherein a portion of said effluent is recycled with the liquid feed to the contact zone to establish the minimum liquid velocity to expand the bed.

3. The process of hydrogenating a carbon containing material as claimed in claim 1 wherein the carbon containing material is a sulfur-containing hydrocarbon oil the particulate solids are a sulf-active hydrogenation catalyst and the reaction conditions in the contact zone are maintained at a hydrogen pressure of about 3000 p.s.i.g. and at a temperature and space velocity such that the percentage of desulfurization of the hydrocarbon oil is at least 60%.

4. The process of hydrogenating a carbon containing material as claimed in claim 3 wherein a portion of the effluent is recycled with the liquid feed to the contact zone such that the percentage of desulfurization of the hydrocarbon oil is at least 80%.

5. The process of hydrogenating a carbon containing material as claimed in claim 3 wherein the carbon containing material is a heavy hydrocarbon oil boiling essentially above about 650° F. and wherein recycled treated oil and up to about 7000 standard cubic feet of hydrogen per barrel of said sulfur containing oil are passed upwardly through the contact zone and wherein at least about two volumes of treated oil is admixed with each volume of said heavy hydrocarbon oil passing through said contact zone.

6. The process of hydrogenating a petroleum oil composed of at least 10% of a fraction boiling above 900° F. and having a sulfur content of at least 1.0% which comprises flowing said oil in liquid phase with a hydrogen rich gas upwardly through a contact zone containing a bed of a particulate hydrogenation catalyst of from 3 to 60 mesh and at a hydrogen pressure and at a temperature and space velocity such that the percentage of desulfurization of the feed hydrocarbon is at least 60% and the conversion of the fraction boiling above 900° F. to a fraction boiling below 900° F. is at least 30%, maintaining a hydrogen rich gas velocity in the order of 1 to 20 standard cubic feet per pound of hydrocarbon charge, withdrawing a reaction effluent containing a substantial amount of liquid from the upper part of the contact zone, and recycling a portion of said reaction effluent to the contact zone together with the liquid feed such that the upflow liquid velocity shall be maintained in the range of 20 to 120 gallons per minute per square foot of horizontal cross section of the zone depending upon the particle size and density of the catalyst to establish at least a 10% expansion of volume of the bed based on the settled volume of the bed and accomplish random motion of the particles without carryover of the particles from the zone.

7. The process of hydrogenating pulverized coal to make synthetic petroleum hydrocarbons which have a substantial fraction boiling below 900° F. which comprises flowing said coal suspended in a hydrocarbon liquid in liquid phase together with a hydrogen rich gas upwardly through a contact zone containing a bed of a particulate hydrogenation catalyst of 3 to 20 mesh and at a pressure in the order of from about 5,000 to 10,000 pounds per square inch gauge and at a temperature and a space velocity such that the conversion of the carbon in the coal to the synthesis petroleum hydrocarbons is about 80%, withdrawing a reaction effluent containing a substantial amount of liquid from the upper part of the contact zone and recycling a portion of said reaction effluent to the contact zone together with the liquid feed such that the upflow liquid velocity shall be maintained in the range of 20 to 120 gallons per minute per square foot of the horizontal cross section of the zone depending upon the particle size and density of the catalyst and the liquid density to establish at least a 10% expansion of volume of the bed based on the settled volume of the bed to accomplish random motion of the catalyst without substantial carryover of catalyst from the contact zone.

8. In chemical reactions exemplified by hydrogenation, desulfurization, hydrocracking, halogenation, oxidation of hydrocarbons, sulfonation, nitration, and amidization involving a three component system of a liquid, a gasiform material and a mass of particulate solids wherein the particulate solids are between about ½" diameter and 60 mesh and are normally maintained within a contact zone, and wherein the contact zone is under temperature and pressure conditions required for the specified reaction, the improvement which comprises passing the liquid and the gasiform material upwardly through the particulate solids, maintaining the linear velocity of the liquid through the mass in the range of 5 to 500 gallons per minute per square foot of horizontal cross section of the contact zone, and, based on the particulate solid size and density and liquid density, being such as to maintain the mass of particulate solids in an expanded state of at least 10% greater volume than the settled state of the mass but below a rate to carryover solids from the zone, maintaining the linear gas rate for the size and density of the solids sufficient to aid in producing a random motion of the solids in the liquid but, by itself, insufficient to accomplish fluidization of the solids, maintaining in said contact zone an upper level of liquid above which substantially no particulate solids are carried, and removing a reacted component from the contact zone.

9. The process of effecting a change as claimed in claim 8 in which the particulate solids are inert.

10. The process of effecting a change as claimed in claim 8 in which the particulate solids are catalytic.

11. The improved process of scrubbing a natural gas containing hydrogen sulfide with an absorbent liquid to remove said hydrogen sulfide from said gas, which comprises passing said gas and said liquid upwardly through a scrubbing zone containing a bed of particulate solids, the particles of which are coarser than 10 mesh, the linear gas velocity for the size and density of the solids being insufficient to fluidize the particles, regulating the flow rate of said liquid upwardly through said scrubbing zone in the range of about 20 to 120 gallons per minute per squire foot of horizontal cross section of said scrubbing zone to expand the settled volume of said bed at least 10% and not to exceed 50% and to cause random movement of said particles in liquid within the expanded volume of said bed without carryover of particles from the bed, withdrawing said liquid with said hydrogen sulfide contained therein and separating scrubbed gas from said liquid.

12. The process of removing soot present in a synthesis gas, which comprises passing water and said gas upwardly through a contact zone containing a bed of a particulate solid from 20 to 35 mesh, maintaining a gas flow rate below a rate which by itself will fluidize the bed, regulating the flow rate of said water upwardly through said contact zone in the range of about 20 to 120 gallons per minute per square foot of horizontal cross section of said contact zone to expand the settled volume of said particulate solid at least 10% and not to exceed 50% and to cause random movement of said particles in the water within the expanded volume of said particulate solid without carryover of particles from said contact zone, removing the gas scrubbed substantially free of said soot, and withdrawing thus contacted water with said soot suspended therein.

References Cited in the file of this patent
UNITED STATES PATENTS

| | | |
|---|---|---|
| 2,438,029 | Atwell | Mar. 16, 1948 |
| 2,443,673 | Atwell | June 22, 1948 |
| 2,533,026 | Matheson | Dec. 5, 1950 |
| 2,706,167 | Harper et al. | Apr. 12, 1955 |
| 2,917,456 | Ashley | Dec. 15, 1959 |